(12) United States Patent
Kahn, III

(10) Patent No.: US 10,485,244 B1
(45) Date of Patent: Nov. 26, 2019

(54) FISH SCALING DEVICE

(71) Applicant: Harry Dante Kahn, III, Englewood, CO (US)

(72) Inventor: Harry Dante Kahn, III, Englewood, CO (US)

( * ) Notice: Subject to any disclaimer, the term of this patent is extended or adjusted under 35 U.S.C. 154(b) by 0 days.

(21) Appl. No.: 16/431,545

(22) Filed: Jun. 4, 2019

Related U.S. Application Data

(60) Provisional application No. 62/681,100, filed on Jun. 6, 2018.

(51) Int. Cl.
*A22C 25/00* (2006.01)
*A22C 25/02* (2006.01)

(52) U.S. Cl.
CPC .................. *A22C 25/025* (2013.01)

(58) Field of Classification Search
CPC ....... A22C 25/00; A22C 25/006; A22C 25/02; A22C 25/025
USPC ..................... 452/102–105, 6, 198
See application file for complete search history.

(56) References Cited

U.S. PATENT DOCUMENTS

| | | | | |
|---|---|---|---|---|
| 2,573,601 A | * | 10/1951 | Rathmell | A22C 25/006 452/103 |
| 3,667,086 A | * | 6/1972 | Sexton | A22C 25/02 452/81 |
| 5,586,931 A | * | 12/1996 | Williams, Jr. | A22C 29/024 30/120.1 |
| 7,179,162 B1 | * | 2/2007 | Twiner | A22C 25/025 452/105 |
| 7,429,211 B2 | * | 9/2008 | Hernandez | A22C 25/025 452/102 |
| 8,172,651 B1 | * | 5/2012 | Trahan | A47J 43/288 452/105 |
| 8,235,775 B1 | * | 8/2012 | Moy | A22C 17/06 452/160 |

* cited by examiner

*Primary Examiner* — Richard T Price, Jr.
(74) *Attorney, Agent, or Firm* — Roger A. Jackson

(57) ABSTRACT

A fish scaling device including a base having a base axis, first and a second extension tines that extend outward from the base to first and second margins, with a first channel formed therebetween, wherein the first and second margins form an acute angle with the base axis. Also a tapered wedge blade expanding toward the base is disposed between the first and second tines, a first and a second finger that extend oppositely outward from the base and first and second tines, wherein the first and second fingers with the wedge blade form a second channel and the respective tines and fingers form first and second points. Operationally, the first and second points lift the fish scale while the first and second margins engage to the fish body, the wedge blade leading edge helps cut the scale from the fish body and the wedge drives the fish scale away.

2 Claims, 7 Drawing Sheets

FISH SCALING DEVICE

RELATED APPLICATION

This application claims the benefit of U.S. provisional patent application Ser. No. 62/681,100 filed on Jun. 6, 2018 by Harry Dante Kahn, III of Englewood, Colo., U.S.

TECHNICAL FIELD

The present invention generally relates to a fish scaling device. More particularly, the present invention uses special configuration blades and channels to make fish scaling easier and faster.

BACKGROUND OF INVENTION

There are many forms of fish scalars, however, most are designed to "scrape" via brute force the scales from a fish by running a straight blade across the scaled surface of the fish to physically dislodge the scales. Looking at the prior art in this area in U.S. Pat. No. 4,162,558 to Rubio, disclosed is a fish scaler tool that connects to a rotary drill that is basically a helically fluted drill bit with serrated edges on the flute edges, thus using the drill to help with the hard to remove scales issue.

Further in the fish scale prior art in U.S. Pat. No. 4,258,452 to Adcock, et al., a method and apparatus for scaling a fish by hand is disclosed wherein the apparatus includes a handle and a scraping element connected to the handle. The scraping element in Adcock includes at least one row of serrated teeth projecting from a surface of the scraping element and a relatively large water conducting tube is fixed with respect to the handle, plus at least one relatively small tube projects from the relatively large water conducting tube and is positioned on the scraping element adjacent to the at least one row of serrated teeth. The relatively small tube in Adcock includes a plurality of angled holes from each of which a jet of water issues to wash the fish being scaled and a valve in the relatively large water conducting tube permits a user to regulate a flow of water through the large tube.

Continuing in the fish scaler prior art in U.S. Pat. No. 4,432,117 to Iskiw, discloses a manually operated fish scaler includes a casing containing an electric motor, a transmission for changing the rotary motion of the motor drive shaft into longitudinal, reciprocating motion and a blade holder for connecting the transmission to a blade, which includes a transversely extending cutting edge for dislodging scales from a Fish.

Next, in the fish scaler prior art in U.S. Pat. No. 5,232,395 to Rushing discloses block-type body member has a handle on the top thereof and a depending flange on the bottom with the flange is curved outwardly and terminates in a sharpened wavy cutting edge capable of moving under fish scales for removing the scales when the device is rubbed against the fish. In a first embodiment in Rushing, the cutting edge extends around the outer defining portion of the body member and in another embodiment the cutting edge depends from triangular bottom wall areas disposed inwardly of the outer defining portion of the body member and the handle has a recessed fit in the body member and preferably comprises a semi-resilient material providing a good grip on the device.

There remains a need for a more complete system for making the fish scale easier to remove by having blades, channels, and cutters that work together to lift, separate, and remove the fish scale.

SUMMARY OF INVENTION

Broadly, the present invention is of a fish scaling device for removing a fish scale from a fish body, the fish scaling device including a base having a base axis, a first extension tine having a first tine proximal end portion and an opposing first tine distal end portion with a first tine axis spanning therebetween, wherein the first extension tine in going from the first proximal end portion to the first distal end portion forms a first margin respectively. Also included in the fish scaling device is a second extension tine having a second tine proximal end portion and an opposing second tine distal end portion with a second tine axis spanning therebetween, wherein the first and second tine axes are substantially parallel to one another resulting in the first and second tine having a spaced apart relation forming a first channel with the first and second proximal end portions being affixed to the base, wherein the second extension tine in going from the second proximal end portion to the second distal end portion forms a second margin, wherein the first and second margins form an acute angle with the base axis.

Continuing, for the fish scaling device a wedge blade is disposed between the first and second tines being spaced away from the first and second margins, the blade having a leading edge adjacent to the first and second distal ends and tapering outward toward the base. Further, a first finger having a first finger proximal end portion and an opposing first finger distal end portion, the first finger extending opposite of the first tine with a position substantially perpendicular to the wedge blade.

In addition, a second finger having a second finger proximal end portion and an opposing second finger distal end portion, the second finger extending opposite of the second tine with a position substantially perpendicular to the wedge blade, wherein the first and second fingers and the wedge blade form a second channel, and wherein the first tine distal end portion and the first finger distal end portion form a first point and the second tine distal end portion and the second finger distal end portion form a second point. Wherein operationally for the fish scaling device the first and second points lift the fish scale while the first and second margins are slidably engaged to the fish body, wherein the wedge blade leading edge helps cut the scale from the fish body and the wedge blade drives the fish scale adjacent to the second channel as the first and second points are pushed under the fish scale.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 6 shows cross section cut 6-6 from FIG. 1, wherein FIG. 6 shows a use view in close up of the fish scaling device using the second tine and opposing finger with the wedge blade and its leading edge in conjunction with the fish and fish scales with manual movement applied to the base; and FIG. 7 shows end view 7-7 from FIG. 1, wherein FIG. 7 shows the positional relationship between the first and second tines and opposing fingers, with the edge blade.

REFERENCE NUMBERS IN DRAWINGS

Figure 1:
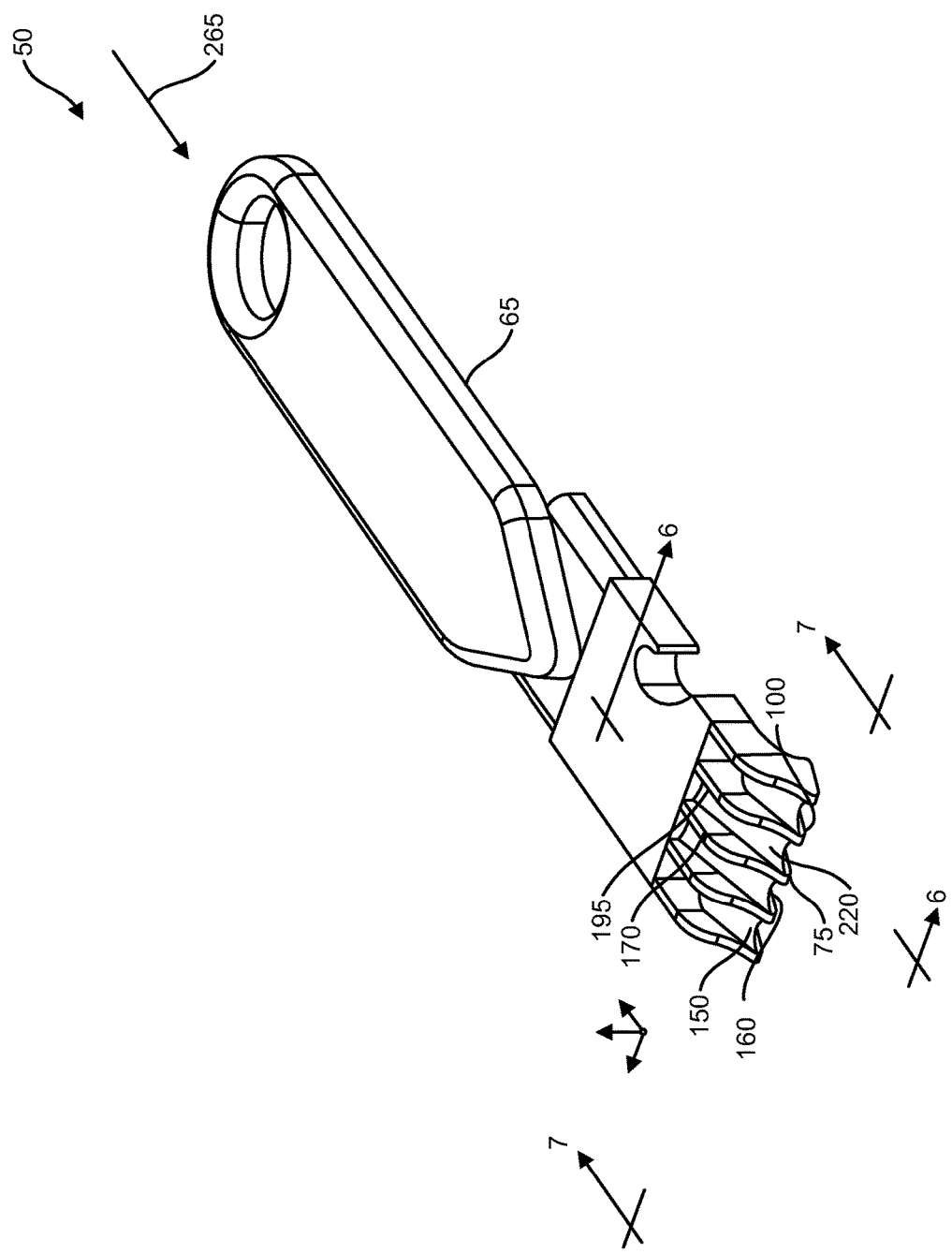
FIG. 1 shows an perspective view of the fish scaling device including the first and second tines, plus the first and second fingers along with the base.

50 Fish scaling device
55 Fish scale
60 Fish body surface
65 Base
70 Axis of the base 65
75 First extension tine
80 Proximal end portion of the first extension tine 75
85 Distal end portion of the first extension tine 75
90 First tine axis
95 First margin
100 Second extension tine
105 Proximal end portion of the second extension tine 100
110 Distal end portion of the second extension tine 100
115 Second tine axis
120 Second margin
125 Parallel position of the first 90 and second 115 tine axes
130 Spaced apart relation of the first 75 and second 100 tines
135 First channel
140 Affixment of the first 80 and second 105 proximal end portions to the base 65
145 Acute angle of the first 95 and second 120 margins in relation to the base axis 70
150 Wedge blade
155 Spaced apart relation of the wedge blade 150 from the first 95 and second 120 margins
160 Leading edge of the wedge blade 150
165 Wedge blade tapering outward toward the base 65
170 First finger
175 Proximal end portion of the first finger 170
180 Distal end portion of the first finger 170
185 First finger 170 extending opposite of the first tine 75
190 First finger 170 substantially perpendicular to the wedge blade 150
195 Second finger
200 Proximal end portion of the second finger 195
205 Distal end portion of the second finger 195
210 Second finger 195 extending opposite of the second tine 100
215 Second finger 195 substantially perpendicular to the wedge blade 150
220 Second channel
225 First point
230 Second point
235 Slidable engagement of the first 95 and second 120 margins to the fish body 60
240 Lifting the fish scale 55 by the first 225 and second 230 points
245 Leading edge 160 helping to cut the scale 55 from the body 60
250 Fish scale 55 adjacent to the second channel 220
255 First 225 and second 230 points pushed under the fish scale 55
260 Inwardly arcuate leading edge of the blade leading edge 160
265 Manual pushing direction as against the base 60

DETAILED DESCRIPTION

Starting with FIG. 1 shown is a perspective view of the of the fish scaling device 50 including the first 75 and second 100 tines, plus the first 170 and second 195 fingers along with the base 65. Next, FIG. 2 shows a top view of the fish scaling device 50 with the first 170 and second 195 fingers, a wedge blade 150, a second channel 220, and an inwardly arcuate edge 260.

Figure 3:
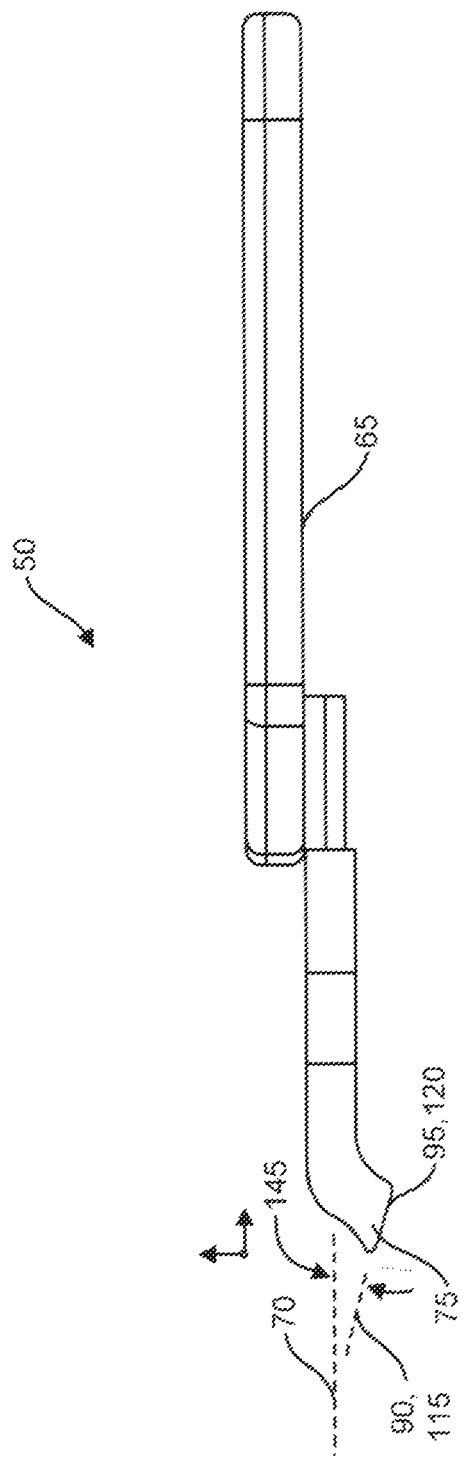
FIG. 3 shows a side elevation view of the fish scaling device that shows an acute angle between a first and a second margin of the first and second tines to the base axis.
Figure 4:
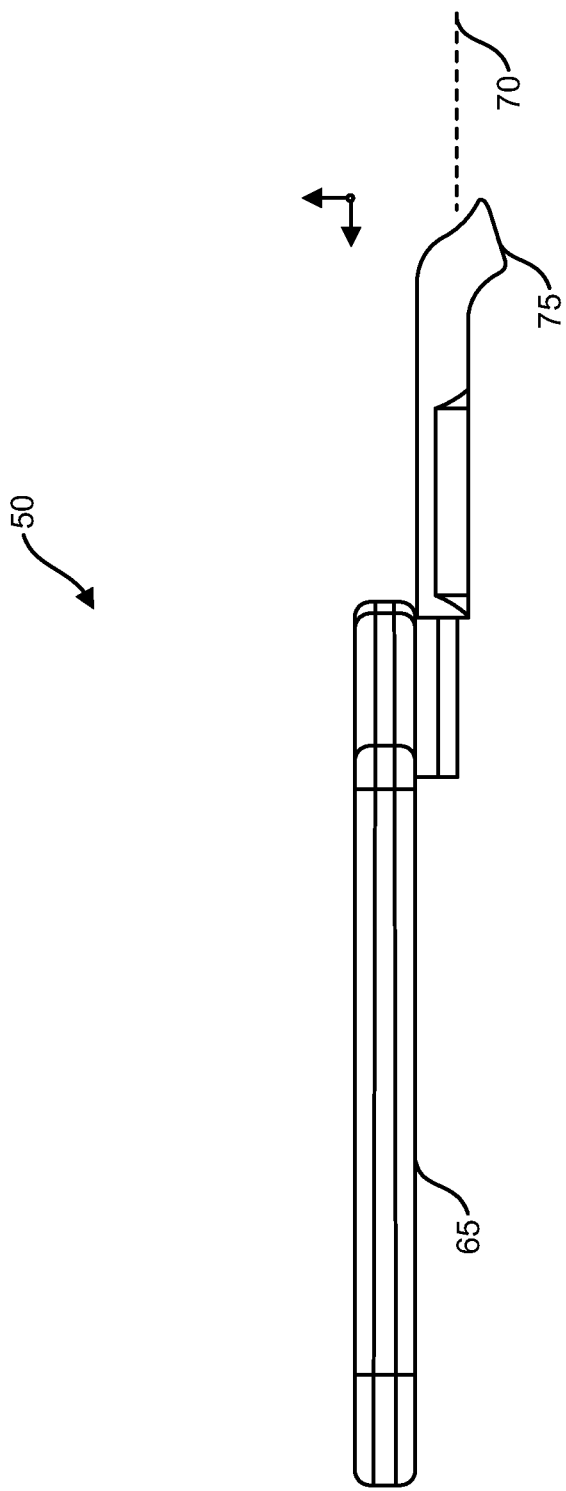
FIG. 4 shows an opposing side elevation view of the fish scaling device.
Figure 5:
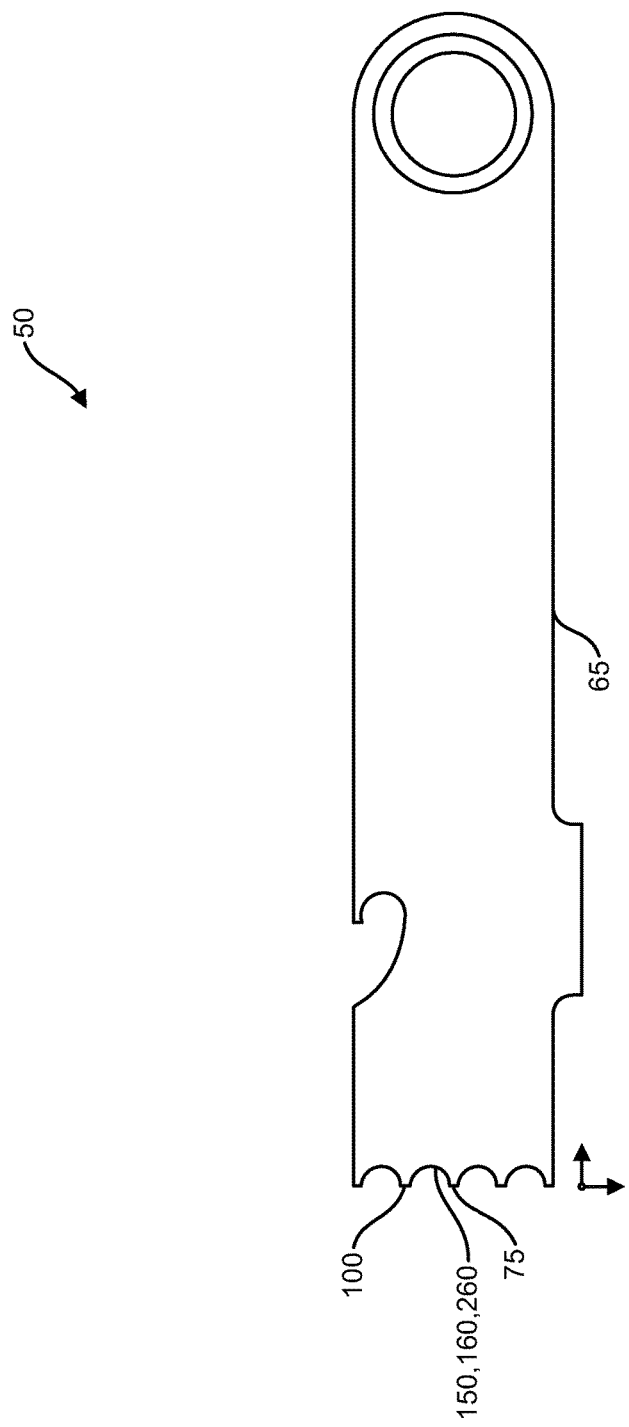
FIG. 5 shows a bottom view of the fish scaling device including the first and second tines with the wedge blade and its leading edge.

Continuing, FIG. 3 shows a side elevation view of the fish scaling device 50 that shows an acute angle 145 between a first 95 and a second 120 margin of the first 75 and second 100 tines to the base axis and further FIG. 4 shows an opposing side elevation view of the fish scaling device 50. Moving onward, FIG. 5 shows a bottom view of the fish scaling device 50 including the first 75 and second 100 tines with the wedge blade 150 and its leading edge 160.

Figure 6:
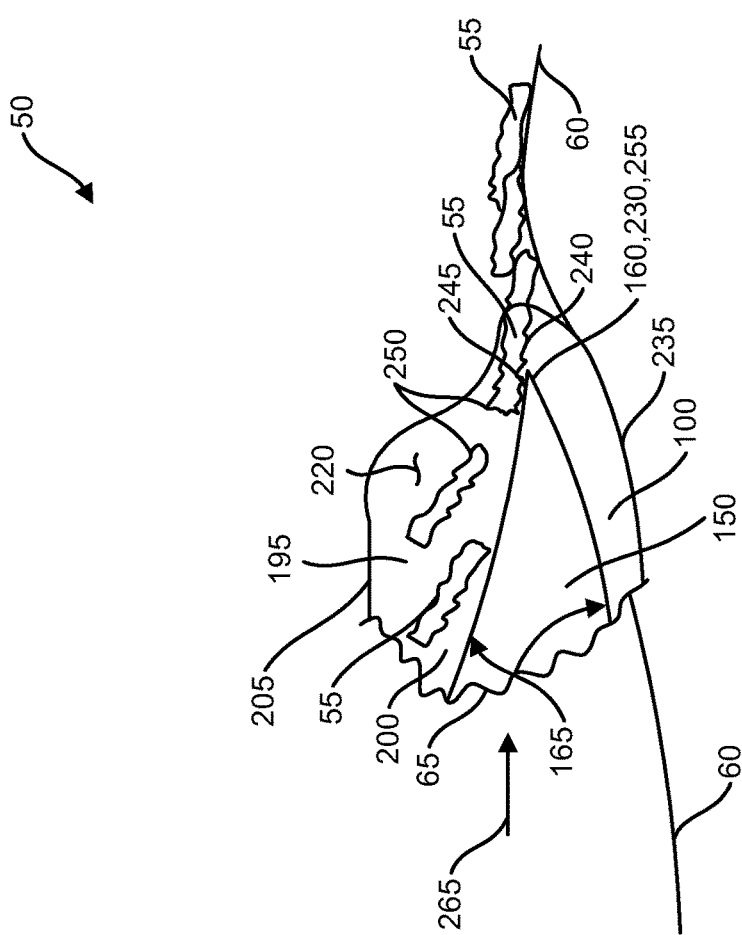

Yet further, FIG. 6 shows cross section cut 6-6 from FIG. 1, wherein FIG. 6 shows a use view of the fish scaling device 50 in close up of the second tine 100 and opposing second finger 195 with the wedge blade 150 and its leading edge 160 in conjunction with the fish 60 and fish scales 55 with manual movement 265 applied to the base 60. Next, FIG. 7 shows end view 7-7 from FIG. 1, wherein FIG. 7 shows the positional relationship between the first 75 and second 100 tines and opposing fingers 170, 195 with the wedge blade 150.

Figure 2:
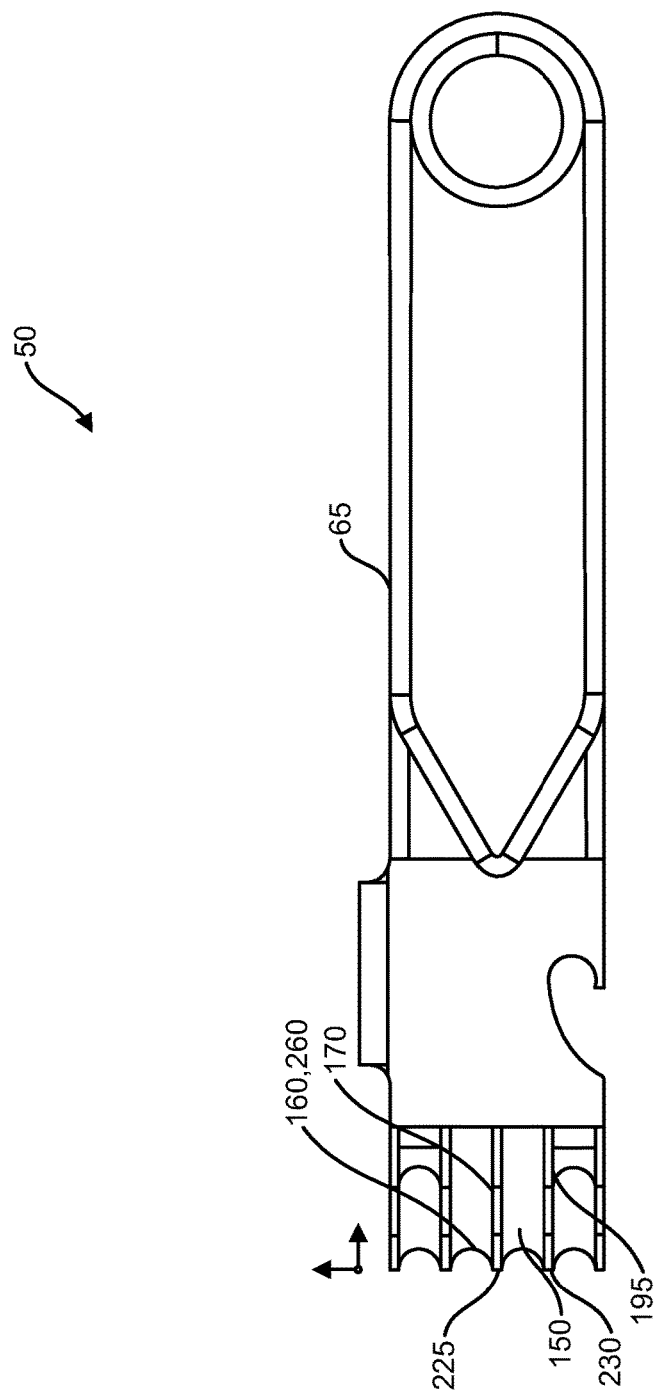
FIG. 2 shows a top view of the fish scaling device with the first and second fingers, a wedge blade, a second channel, and an inwardly arcuate edge.
Figure 7:
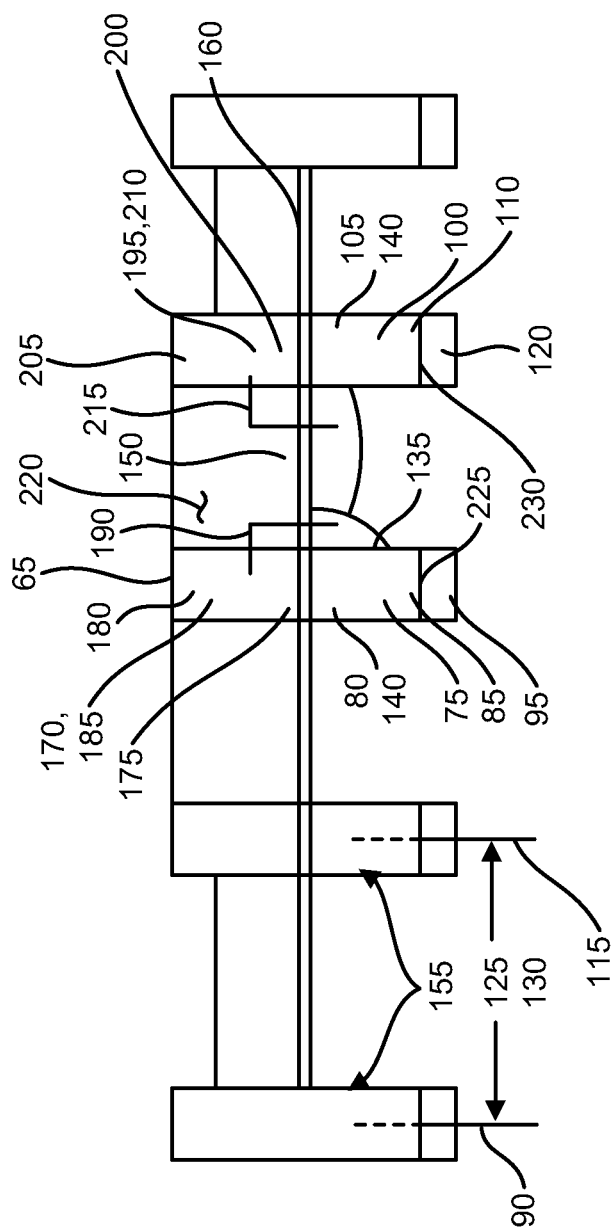

Broadly, the present invention is of the fish scaling device 50 for removing the fish 60 scale 55 from the fish 60 body, the fish scaling device 50 including the base 60 having the base 65 axis 70, the first extension tine 75 having a first tine proximal end portion 80 and an opposing first tine distal end portion 85 with a first tine axis 90 spanning therebetween, wherein the first extension tine 75 in going from the first proximal end portion 80 to the first distal end portion 85 forms the first margin 95 respectively, see in particular FIG. 7, also FIGS. 1, 2, and 6. Also included in the fish scaling device 50 is a second extension tine 100 having a second tine proximal end portion 105 and an opposing second tine distal end portion 110 with a second tine axis 115 spanning therebetween, wherein the first 90 and second 115 tine axes are substantially parallel 125 to one another resulting in the first 75 and second 100 tines having a spaced apart relation 130 forming a first channel 135 with the first 80 and second 105 proximal end portions being affixed 140 to the base 65, see in particular FIG. 7, also FIGS. 1, 2, and 6. Wherein the second extension tine 100 in going from the second proximal end portion 105 to the second distal end portion 110 forms the second margin 120, wherein the first 95 and second 120 margins form the acute angle 145 with the base 65 axis 70, as best shown in FIG. 3.

Continuing, for the fish scaling device 50 the wedge blade 150 is disposed between the first 75 and second 100 tines being spaced away 155 from the first 95 and second 120 margins, the blade 150 having a leading edge 160 adjacent to the first 85 and second 110 distal ends and tapering 165 outward toward the base 65, as best shown in FIG. 6, plus FIGS. 1, 2, and 7. Further, the first finger 170 having a first finger proximal end portion 175 and an opposing first finger distal end portion 180, the first finger 170 extending opposite 185 of the first tine 75 with a position substantially perpendicular 190 to the wedge blade 150, see in particular FIG. 7.

In addition, the second finger 195 having a second finger proximal end portion 200 and an opposing second finger distal end portion 205, the second finger 195 extending opposite 210 of the second tine 100 with a position substantially perpendicular 215 to the wedge blade 150, again see FIG. 7, wherein the first 170 and second 195 fingers and the wedge blade 150 form the second channel 220, and wherein the first tine 75 distal end portion 85 and the first finger 170 distal end portion 180 form a first point 225 and the second tine 100 distal end portion 110 and the second finger 195 distal end portion 205 form a second point 230, see FIGS. 6 and 7, plus FIGS. 1 and 2. Wherein operationally for the fish scaling device 60 in looking at FIG. 6 the first 225 and second 230 points lift 240 the fish scale 55 while the first 95 and second 120 margins are slidably engaged 235 to the fish body 60, wherein the wedge blade 150 leading edge 160 helps cut 245 the scale 55 from the fish body 60 and the wedge blade 150 drives the fish scale 55 adjacent 250 to the second channel 220 as the first 225 and second 230 points are pushed 255 under the fish scale 55. Optionally on the wedge blade 150 it can have the inwardly arcuate leading edge 260 for easier scale 55 separation from the fish 60, see FIGS. 1 and 2 in particular.

CONCLUSION

Accordingly, the present invention of the fish scaling device has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A fish scaling device for removing a fish scale from a fish body, said fish scaling device comprising:
(a) a base having a base axis;
(b) a first extension tine having a first tine proximal end portion and an opposing first tine distal end portion with a first tine axis spanning therebetween, wherein said first extension tine in going from said first proximal end portion to said first distal end portion forms a first margin respectively;
(c) a second extension tine having a second tine proximal end portion and an opposing second tine distal end portion with a second tine axis spanning therebetween, wherein said first and second tine axes are substantially parallel to one another resulting in said first and second tine having a spaced apart relation forming a first channel with said first and second proximal end portions are affixed to said base, wherein said second extension tine in going from said second proximal end portion to said second distal end portion forms a second margin, wherein said first and second margins form an acute angle with said base axis;
(d) a wedge blade disposed between said first and second tines being spaced away from said first and second margins, said blade having a leading edge adjacent to said first and second distal ends and tapering outward toward said base;
(e) a first finger having a first finger proximal end portion and an opposing first finger distal end portion, said first finger extending opposite of said first tine with a position substantially perpendicular to said wedge blade; and
(f) a second finger having a second finger proximal end portion and an opposing second finger distal end portion, said second finger extending opposite of said second tine with a position substantially perpendicular to said wedge blade, wherein said first and second fingers and said wedge blade form a second channel, and wherein said first tine distal end portion and said first finger distal end portion form a first point and said second tine distal end portion and said second finger distal end portion form a second point, wherein operationally said first and second points lift the fish scale while said first and second margins are slidably engaged to the fish body, wherein said wedge blade leading edge helps cut the scale from the fish body and said wedge blade drives the fish scale adjacent to said second channel as said first and second points are pushed under the fish scale.

2. A fish scaling device according to claim 1 wherein said blade leading edge is constructed in the form of an inwardly arcuate leading edge as between said first and second tine distal end portions to operationally cause an angled cut for easier cutting removal of the fish scale from the fish body.

* * * * *